United States Patent [19]
Miyake

[11] Patent Number: 5,564,034
[45] Date of Patent: Oct. 8, 1996

[54] CACHE MEMORY WITH A WRITE BUFFER INDICATING WAY SELECTION

[75] Inventor: Jiro Miyake, Osaka, Japan

[73] Assignee: Matsushita Electric Industrial Co., Ltd., Osaka, Japan

[21] Appl. No.: 124,483

[22] Filed: Sep. 22, 1993

[30] Foreign Application Priority Data

Sep. 24, 1992 [JP] Japan ................................. 4-254303

[51] Int. Cl.⁶ ................................................. G06F 13/00
[52] U.S. Cl. ........................ 395/455; 395/467; 395/483; 395/486
[58] Field of Search ................................. 395/465, 467, 395/483, 486, 496, 455

[56] References Cited

U.S. PATENT DOCUMENTS 5,155,824 10/1992 Edenfield et al. ...................... 395/470

FOREIGN PATENT DOCUMENTS 2-66652 3/1990 Japan .

OTHER PUBLICATIONS

Mike Johnson, "Superscalar Microprocssor Design", pp. 150–152 (1991).

*Primary Examiner*—David L. Robertson
*Attorney, Agent, or Firm*—McDermott, Will & Emery

[57] ABSTRACT

The present invention discloses a 2-way set-associative cache memory incorporating thereinto a write buffer. Tag entries corresponding to data entries within each bank are added valid bits and write reserve bits. The write reserve bit is set when a write request occurs and is reset when the requested write operation is completed. When a cache miss occurs, a replacement controller selects one of two data entries as a candidate for replacement (i.e., a data entry to which a corresponding write reserve bit is not set).

16 Claims, 10 Drawing Sheets

|        | V(a) | Res(a) | V(b) | Res(b) | Rep  |
|--------|------|--------|------|--------|------|
| case 1 | 0    | X      | 0    | X      | -Rep |
| case 2 | 1    | X      | 0    | X      | 1    |
| case 3 | 0    | X      | 1    | X      | 0    |
| case 4 | 1    | 0      | 1    | 0      | -Rep |
| case 5 | 1    | 1      | 1    | 0      | 1    |
| case 6 | 1    | 0      | 1    | 1      | 0    |
| case 7 | 1    | 1      | 1    | 1      | X    |

CACHE MEMORY WITH A WRITE BUFFER INDICATING WAY SELECTION

FIELD OF THE INVENTION

This invention relates to cache memories that find applications in data processors and in particular to a cache memory incorporating a write buffer for temporarily holding write requests.

BACKGROUND OF THE INVENTION

As, in usual computer programs, load/store instructions are frequently issued, it becomes more important for data processors to deal with such instructions at high speed for their best performance. A cache memory, into which data can be written and from which data can be read at a high speed by a central processing unit (CPU), offers solutions to such an issue.

When a CPU issues to a cache memory a write request on the basis of a store instruction, it does not have to wait for that write request to be completed. If a CPU issues a read request on the basis of a load instruction, it immediately needs data in question from a cache memory so as to respond to that read request. To improve data processor performance, various techniques are proposed. In one of these techniques, a load instruction is given priority and thus is preferentially dealt with by keeping a store instruction in the wait state. One such technique is disclosed by Mike Johnson in "Superscalar Microprocessor Design", published by Prentice Hall, N.J., 1991, pp. 150–152.

Taking, for example, such a case that a store instruction gives rise to a cache miss in an instruction sequence in which a load instruction follows immediately after the store instruction. In such a status, a cache memory fetches from a main memory data of the address of the store instruction and replaces its own data entry with the data thus fetched. A main memory is very slow compared to a cache memory, so that if a subsequent load instruction is held up until completion of a store instruction this causes serious performance loss.

In pipeline data processors, when a store instruction stores an instruction result obtained by arithmetic operations over a plurality of cycles, the address of data being stored becomes available at once. Data to be stored, however, may not become available at once due to incompletion of arithmetical operations for a previous instruction. When a load instruction follows after a store instruction, keeping the former in the wait state until completion of the latter results in the loss in performance.

Therefore, in the above-described case where it is not possible to immediately execute a store instruction, a load instruction is preferentially executed by holding up the execution of a store instruction. It is however to be noted that if the address of data to be stored and the address of data to be loaded are the same this does not give priority to the execution of a load instruction. This status is detected by an address comparator. In the case that a load instruction is to be executed preferentially while plural store instructions are kept in the wait state, plural latches capable of holding plural data items to be stored and their addresses are provided, and a comparison of the address of data to be loaded and the address of each of plural data items to be stored is made. The number of comparators and the number of latches must be identical with each other.

Figure 10:
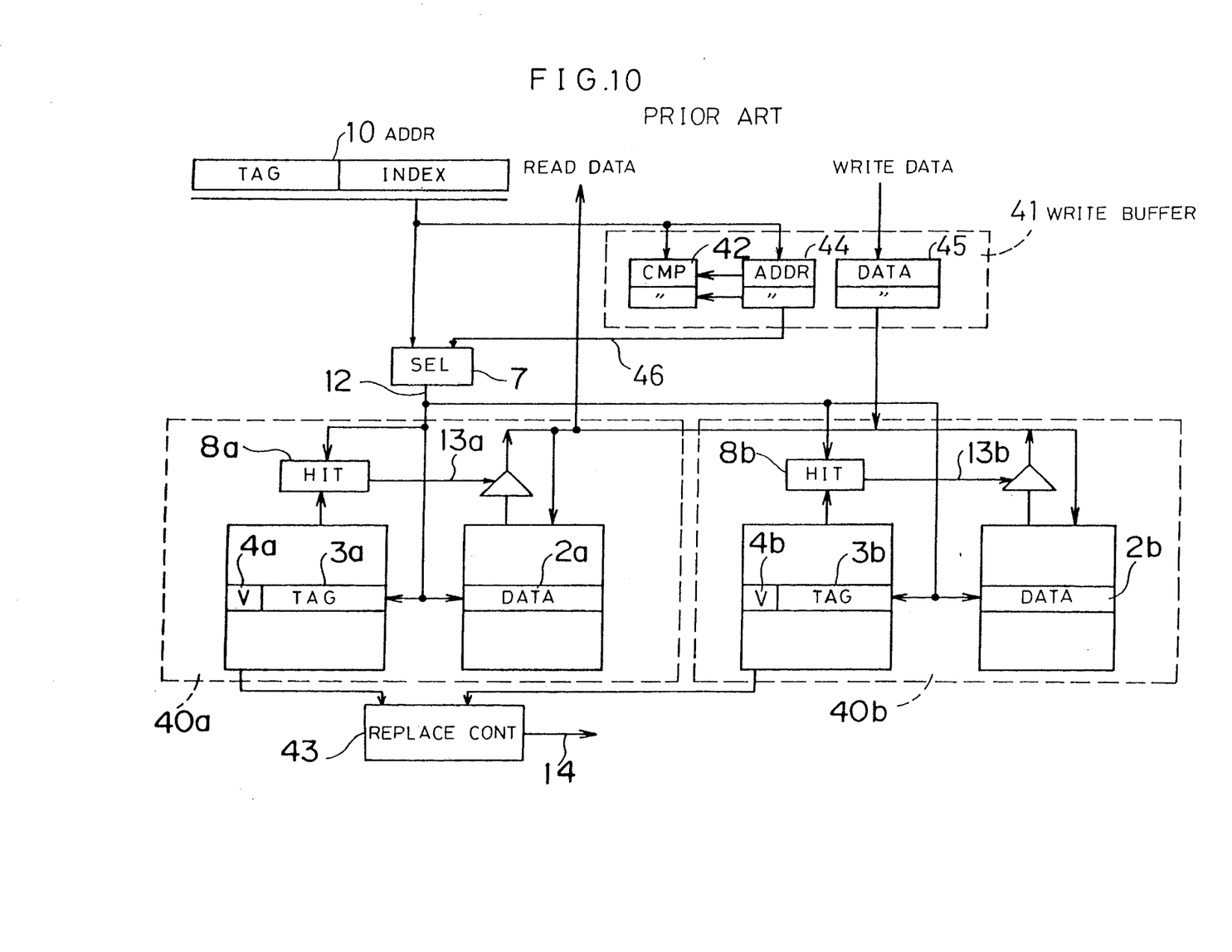
FIG. 10 is a block diagram of a conventional cache memory.

FIG. 10 is a conventional two-way set-associative cache memory. This conventional cache memory is now described. Banks 40a and 40b are provided. The first bank 40a has a plurality of DATA ENTRIES 2a for the storage of data, a plurality of TAG ENTRIES 3a for the storage of address information of data, and a plurality of VALID bits 4a indicative of whether specific data is valid. Likewise, the second bank 40b has a plurality of DATA ENTRIES 2b, a plurality of TAG ENTRIES 3b and a plurality of VALID bits 4b all of which are identical in function with their counterparts in the first bank 40a. A write buffer 41 holds a WRITE ADDRESS 44 and WRITE DATA 45 in relation to a store instruction. The write buffer 44, used here, can hold two WRITE ADDRESSES 44 and two items of WRITE DATA 45. The write buffer 41 further includes a coincidence comparator 42 for making a comparison between the WRITE ADDRESS 44 held and an ADDRESS 10 given from a CPU. A selector 7 selects the ADDRESS 10 from the CPU or a WRITE ADDRESS 46 output from the write buffer 41, thereby outputting the ADDRESS 10 or the WRITE ADDRESS 46, whichever is selected, as a SELECTED ADDRESS 12. Hit detectors 8a and 8b are provided. The hit detector 8a checks the first bank 1a for the occurrence of a cache hit, whereas the hit detector 8b checks the second bank 1b for the occurrence of a cache hit. CACHE HIT SIGNALS (CHITs) are represented by reference numerals 13a and 13b respectively. A replacement controller 43, at the time when a cache miss occurs, sends out a SELECTION signal 14 indicating which data entry to replace.

When a store instruction is executed, the selector 7 selects the ADDRESS 10 given from the CPU and outputs it. The TAG ENTRIES 3a and 3b are read out together with the VALID bits 4a and 4b. The hit detectors 8a and 8a determine whether a cache hit or cache miss occurs. If a cache hit is detected, this keeps the ADDRESS 10 stored in the write buffer 41 as the WRITE ADDRESS 44 until write data becomes available. Then, when a load instruction is executed, the hit detectors 8a and 8b likewise determine whether a cache hit or cache miss occurs, and at the same time the coincidence comparator 42 compares the ADDRESS 10 with the ADDRESS 44 held at the write buffer 41. If a successful comparison of the ADDRESS 10 and the ADDRESS 44 occurs, this means that data to be read out by the load instruction is the very data to be stored by the store instruction. A read operation by the load instruction is held up until completion of a write operation by the store instruction.

In the above-described set-associative type cache memory, plural entries exist to hold data in relation to a single address. However, it is impossible to know which data entry to write by a store instruction kept in the wait state. Due to this, even though a mismatch of two addresses is detected, a load instruction that has caused a cache miss is likely to replace an entry to be stored. Because of this, a cache miss will occur in relation to a store instruction. This results in the malfunction of data processor, thus leading to the drop in data processor performance. Even with a directly mapped cache memory, when preferentially dealing with a load instruction by holding up the execution of a store instruction, a load instruction that has caused a cache miss may accidentally replace an entry to be stored.

Additionally, even when attempting to preferentially deal with a load instruction by holding up the execution of a store instruction, if a write address held at a write buffer and a read address are the same, this keeps a read operation by the load instruction in the wait state until a write operation by the store instruction is over. Therefore, the speed of instruction processing cannot be improved.

Further, if a cache hit is detected at a first cycle and write operation is executed at the next cycle when executing store instructions in succession, each store instruction requires two cycles. Clearly, this presents a serious obstacle to the improvement of data processor performance.

DISCLOSURE OF INVENTION

Bearing in mind the aforesaid problems existing in the prior art techniques, the present invention was made. It is a main object of the present invention to prevent cache memory malfunction and thus to improve cache memory performance.

The present invention discloses a first cache memory which employs a configuration in which a write reserve bit is set when a write request occurs to a data entry and is reset when the requested write operation is over. Where the present invention is applied to a set-associative cache memory, in order to select a particular data entry corresponding to a cache access in the wait state when exerting replacement control at the time of the occurrence of a cache miss, a data entry to which a write reserve bit is not set is preferentially selected as a data entry to be replaced. This prevents faulty operation that is likely to occur when a read operation is carried out while a write operation is kept in the wait state, thereby improving data processor performance.

Where the present invention is applied to a directly mapped cache memory, it is possible to keep a read request in the wait state if a write reserve bit is set. Additionally, by making use of write reserve bits, it becomes possible to transfer to a CPU data held at a write buffer as read data.

The present invention discloses a second cache memory. In accordance with the second cache memory: hit information in relation to a write request is held at a write buffer; the index part of an address in relation to a new access is compared with the index part of a write address held at the write buffer; and the hit information held is compared with hit information in relation to the new access. The results of such comparison are reflected in replacement control when a cache miss occurs, in order to select a particular data entry to be replaced for the new access which is different from a data entry to be replaced for the write request kept in the wait state. Like the first cache memory, this makes it possible to select from among data entries a right candidate for replacement.

The present invention provides a third cache memory. In accordance with the third cache memory, in order to simultaneously execute a tag read operation to detect a hit and a data write operation in relation to two successive write requests, cache hit information is held at a write buffer, and a data entry, into which data is written, is selected using the index part of an address and the hit information held. Accordingly, store instructions in succession can be dealt with at high speed in a pipeline processing manner.

PREFERRED EMBODIMENTS OF THE INVENTION

Preferred embodiments are described with reference to the drawings.

EXAMPLE 1

Figure 1:
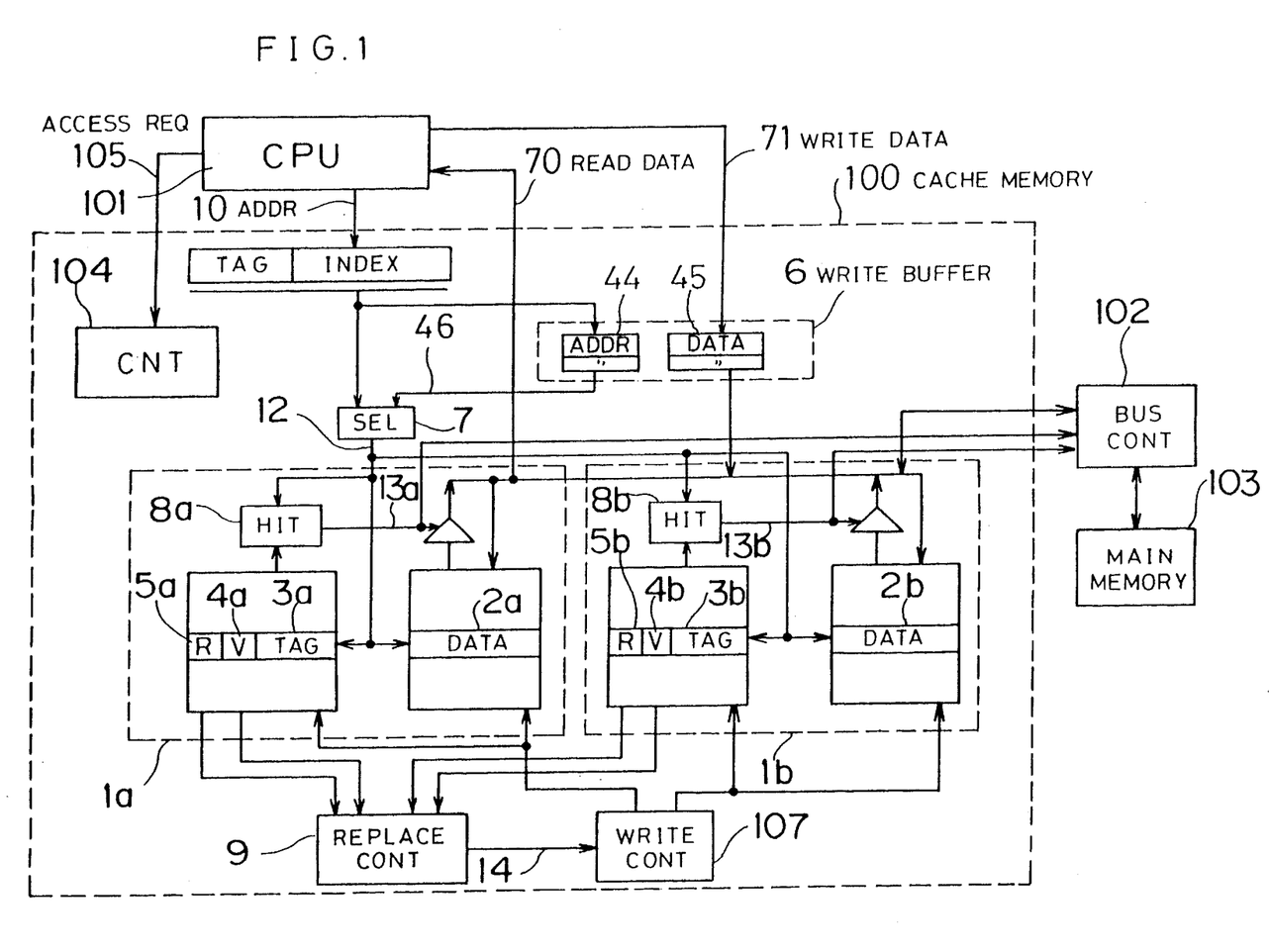
FIG. 1 is a block diagram of a data processor employing a first cache memory of the invention.

FIG. 1 is a first cache memory of the present invention. For simplicity's sake, a case, where the first cache memory is a two-way set-associative cache memory, is described. Shown in FIG. 1 are a cache memory 100, a central processing unit (CPU) 101, a bus controller 102, and a main memory 103. Banks 1a and 1b are also shown. The first bank 1a has a plurality of DATA ENTRIES 2a for holding data, a plurality of TAG ENTRIES 3a for holding tag parts of data addresses, a plurality of VALID bits 4a indicative of whether data is valid, and a plurality of WRITE RESERVE bits 5a indicative of incompletion of a data write operation. Like the first bank 1a, the second bank 1b has a plurality of DATA ENTRIES 2b, a plurality of TAG ENTRIES 3b, a plurality of VALID bits 4b, and a plurality of WRITE RESERVE bits 5b. A write buffer 6 holds a WRITE ADDRESS 44 and WRITE DATA 45 in relation to a store instruction. The write buffer 6, used here in the present example, is able to hold two WRITE ADDRESSES 44 and two items of WRITE DATA 45. A selector 7 selects an ADDRESS 10 from the CPU 101 or a WRITE ADDRESS 46 from the write buffer 6, thereby outputting the ADDRESS 10 or the WRITE ADDRESS 46, whichever is selected. Cache hit detectors 8a and 8b check the banks 1a and 1b respectively for the occurrence of a cache hit. A controller 104 controls the cache memory 100 on an ACCESS REQUEST 105 from the CPU 101.

When a load instruction is executed, the CPU 101 delivers the ADDRESS 10 of data to be read out and makes a read request on the ACCESS REQUEST 105. The ADDRESS 10 is formed by two parts, a tag part composed of the high-order bits of the address and an index part composed of the low-order bits of the address. The selector 7 selects the ADDRESS 10 received from the CPU 101. Both the DATA ENTRIES TRIES 2a and 2b are read out by the use of the index part of a SELECTED ADDRESS 12 output from the selector 7. At the same time, the corresponding TAG ENTRIES 3a and 3b and VALID bits 4a and 4b are read out. The hit detectors 8a and 8b determine whether a hit occurs. The hit detector 8a compares the tag part of the SELECTED ADDRESS 12 (READ ADDRESS) with the contents of the TAG ENTRY 3a. Likewise, the hit detector 8b compares the tag part of the SELECTED ADDRESS 12 with the contents of the TAG ENTRY 3b. If they are the same, and if the VALID bit 4a or 4b is logic 1, this is termed as a cache hit.

The hit detector 8a, if it detects a cache hit, sends out a CACHE HIT SIGNAL (CHIT) 13a whereby data held at the DATA ENTRY 2a is fed to the CPU 101 as READ DATA 70. On the other hand, the hit detector 8b if it detects a cache hit, sends out a CHIT 13b whereby data held at the DATA ENTRY 2b is fed to the CPU 101 as the READ DATA 70. If neither of the hit detectors 8a and 8b finds a cache hit, this result is communicated by the CHITs 13a and 13b to the bus controller 102. The bus controller 102 then fetches the corresponding data from the main memory 103 by the use of the READ ADDRESS 12 that has caused a cache miss and stores it into the DATA ENTRY 2a or the DATA ENTRY 2b, whichever is designated by the index part of the READ ADDRESS 12. The replacement controller 9 selects one of the banks 1a and 1b so as to store the data into it. The write controller 107 exerts write control by a SELECTION signal 14 output from the replacement controller 9. Then, when data read out from the main memory 103 is stored into a data entry designated, the tag part of the ADDRESS 10, too, is stored into the corresponding tag entry. The VALID bit 4a or the VALID bit 4b is set at logic 1. There are several systems for bank selection, such as the random selection system, the alternate selection system in which banks are selected alternately, and the LRU (Least-Recently-Used) system in which every bit is given cache hit history information whereby an entry which has been used least often is selected on the basis of such information.

When a store instruction is executed, the CPU 101 delivers WRITE DATA 71 to be written and its ADDRESS 10 and makes a write request on the ACCESS REQUEST 105. A write operation to a cache must be carried out after a cache hit is detected and after a bank is selected for data transmission. This necessitates two cycles, one used to detect a cache hit and the other used to write information. Because of this, the WRITE ADDRESS 10 and the WRITE DATA 71 are temporarily stored into the write buffer 6. If a cache hit occurs, the selector 7 selects the WRITE ADDRESS 46 output from the write buffer 6 at the next cycle, thereafter mutually delivering the WRITE ADDRESS 46 to both the bank 1a and the bank 1b. As a result, a write operation is carried out to a bank hit. If data to be written by a store instruction is data as a result of an earlier instruction, and if such resulting data does not become available at once, this keeps only the WRITE ADDRESS 44 held at the write buffer 6 until the data in question becomes available, and a write operation is kept waiting. When a cache miss occurs, this occurrence is communicated by the CHITs 13a and 13b to the bus controller 102. The corresponding data is read out from the main memory 103 by the use of the ADDRESS 12 output from the selector 7, thereafter being stored into the corresponding data entry within the bank 1a or 1b. Meanwhile, both the WRITE ADDRESS 44 and the WRITE DATA 45 are kept standing by at the write buffer 6. When writing information to the DATA ENTRY 2a or the DATA ENTRY 2b, data read out from the main memory 103 is partly replaced by write data and is written to a data entry. The WRITE RESERVE bits 5a and 5b are set at logic 1's when a cache hit or a cache miss is detected. When a cache is detected, the WRITE RESERVE bit 5a or the WRITE RESERVE bit 5b whichever corresponds to a data entry of a bank hit, is set. When a cache miss is detected, the WRITE RESERVE bit 5a or the WRITE RESERVE bit 5b, whichever corresponds to a data entry of a bank into which data read out from the main memory 103 is stored, is set at logic 1. The replacement controller 9 determines which of the banks 1a and 1b to write. The WRITE RESERVE bits 5a and 5b are set at logic 0's when a data write operation actually starts.

If a read request (i.e. a load instruction) issued from the CPU 101 causes a cache miss, the corresponding data is fetched from the main memory 103 and then is stored into one of the DATA ENTRIES 2a and 2b. At the time when both the TAGs 3a and 3b and VALID bits 4a and 4b are read out, the WRITE RESERVE bits 5a and 5b, too, are read out. If the WRITE RESERVE bit 5a or the WRITE RESERVE bit 5b is set at logic 1, this tells that a write request, now kept waiting, is due to be carried out with respect to the corresponding data entry. This is such a status that the index part of a read address and the index part of a write address kept in the wait state are the same but their tag parts are different. The replacement controller 9 selects one of the banks 1a and 1b whose write reserve bit is not logic 1 and then sends out the SELECTION signal 14. If a plurality of write requests are kept in the wait state, and if both the WRITE RESERVE bit 5a and the WRITE RESERVE bit 5b are set at logic 1's, the execution of a read request is held up until completion of write operations of the write requests. Additionally, if a cache hit occurs in relation to a read request, and if the corresponding WRITE RESERVE bit 5a or 5b is set at logic 1, this tells that a write address kept in the wait state and a read address by a load instruction are the same. In this case, it is necessary to transfer to the CPU 101 data being written as read data. Accordingly, a read operation is held up until a write operation of a write instruction that has been kept in the wait state is over. If a cache hit occurs in relation to a read request, and if the corresponding WRITE RESERVE bit 5a or 5b is set at logic 0, the corresponding data is output to the CPU 101. The CPU 101 keeps running the program without waiting for a write operation to be completed.

Figure 2:
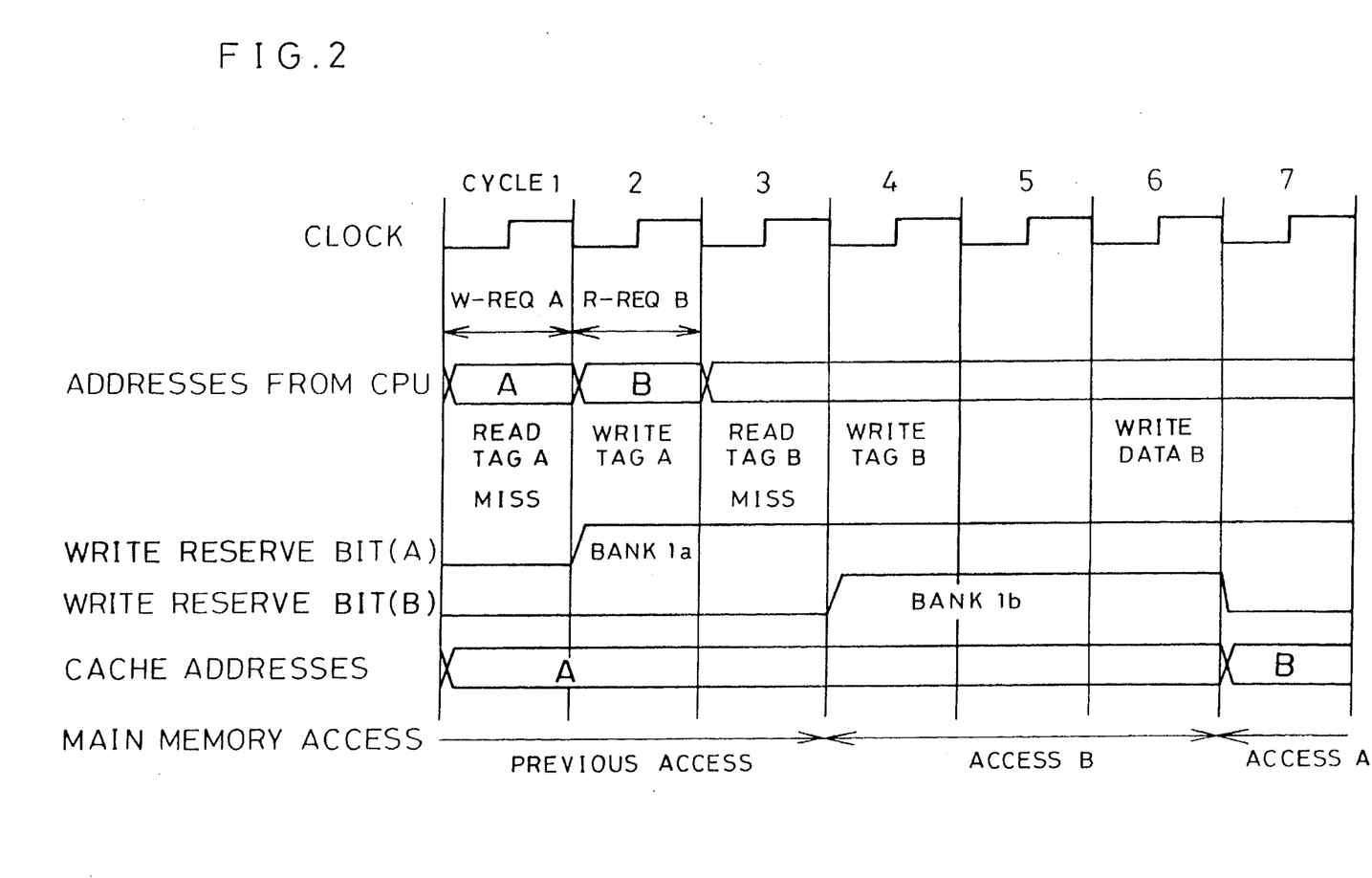
FIG. 2 is a timing diagram showing a case where a write request and a read request are issued successively to the first cache memory.

By reference to FIG. 2, an example is explained. The check for the occurrence of a cache hit or cache miss in relation to a store instruction is over, and before a data write operation is over the CPU 101 issues a load instruction. Data processor performance can be improved by forcing a cache to attend to a read operation in relation to a load instruction before a write operation in relation to a store instruction is over.

Suppose there is a store instruction request to an ADDRESS "A" output from the CPU 101 at cycle 1 and there is a load instruction to an ADDRESS "B" at cycle 2. Here, the index parts of the ADDRESS "A" and the ADDRESS "B" are the same but their tag parts are different. At cycle 1, a cache tag is read out and a cache miss occurs to the ADDRESS "A". Then, both the VALID bit 4a and the VALID bit 4b read out from the banks 1a and 1b are logic 1's, and both the WRITE RESERVE bit 5a and the WRITE RESERVE bit 5b read out from the banks 1a and 1b are logic 0's. The replacement controller 9 selects the first bank 1a so that data of the ADDRESS "A" is stored into the bank 1a. At cycle 2, the tag part of the ADDRESS "A" is stored into the corresponding TAG ENTRY 3a of the first bank 1a, and both the VALID bit 4a and the WRITE RESERVE bit 5a are set at logic 1's. At this point in time, the main memory 103 is being busy because of an earlier access, as a result of which the main memory's 103 access in relation to an ACCESS "A" is held up. At cycle 3, a cache tag is read out in relation to an ACCESS "B", and the check for the occurrence of a cache hit or cache miss is made. Since the index parts of the ADDRESS "A" and the ADDRESS "B" are the same but their tag parts are different, a cache miss occurs. However, the WRITE RESERVE bit 5a is read out from the first bank 1a, telling that information is about to be written into the first bank 1a by the ACCESS "A". Based on the VALID bits 4a and 4b read out as well as based on the WRITE RESERVE bits 5a and 5b read out, the replacement controller 9 selects the second bank 1b in relation to the ADDRESS "B" as a bank to be replaced. At cycle 4, the tag part of the ADDRESS "B" is stored into the corresponding TAG ENTRY 3b of the second bank 1b and both the VALID bit 4b and the WRITE RESERVE bit 5b are set at logic 1's. As the foregoing earlier access to the main memory 103 should be over at cycle 3, it becomes possible to start the main memory's 103 access in relation to an ACCESS REQUEST "A" or ACCESS REQUEST "B". The CPU 101, by dealing with load instructions at high speed, can deal with subsequent instructions at high speed and improve it own performance. In view of this, at cycle 4, the main memory 103 is accessed in relation to the ACCESS REQUEST "B" At cycle 6, data in relation to the ADDRESS "B" is read out from the main memory 103. Such data is transmitted to the CPU 101 and at the same time is stored into the corresponding DATA ENTRY 2b of the second bank 1b. The WRITE RESERVE bit 5b is reset at logic 0. At cycle 7, the main memory's 103 access begins to the ACCESS "A" that has been kept in the wait state at the write buffer 6.

Since two different addresses whose index parts are the same but whose tag parts are different can be assigned different banks, a cache memory can be used effectively. Additionally, even if a later access is dealt with first, this will not rewrite a tag stored in relation to an earlier access, thereby preventing the occurrence of faulty operation.

In the above described example, if the ADDRESS "A" and the ADDRESS "B" are identical with each other, a tag coincidence occurs and the VALID bit 4a is found to be logic 1 when the TAG 3a of the first bank 1a is read out in relation to the ADDRESS "B" at cycle 3. Since the WRITE RESERVE bit 5a, however, is logic 1, data held at the corresponding DATA ENTRY 2a is found to be data prior to the updating by the ACCESS "A". The ACCESS "B", therefore, must wait for a write operation by the ACCESS "A" to be completed.

When the ADDRESSES "A" and "B" have different index parts, a bank into which data is stored in relation to the ADDRESS "B" is selected, regardless of banks in relation to the ADDRESS "A".

Figure 3:
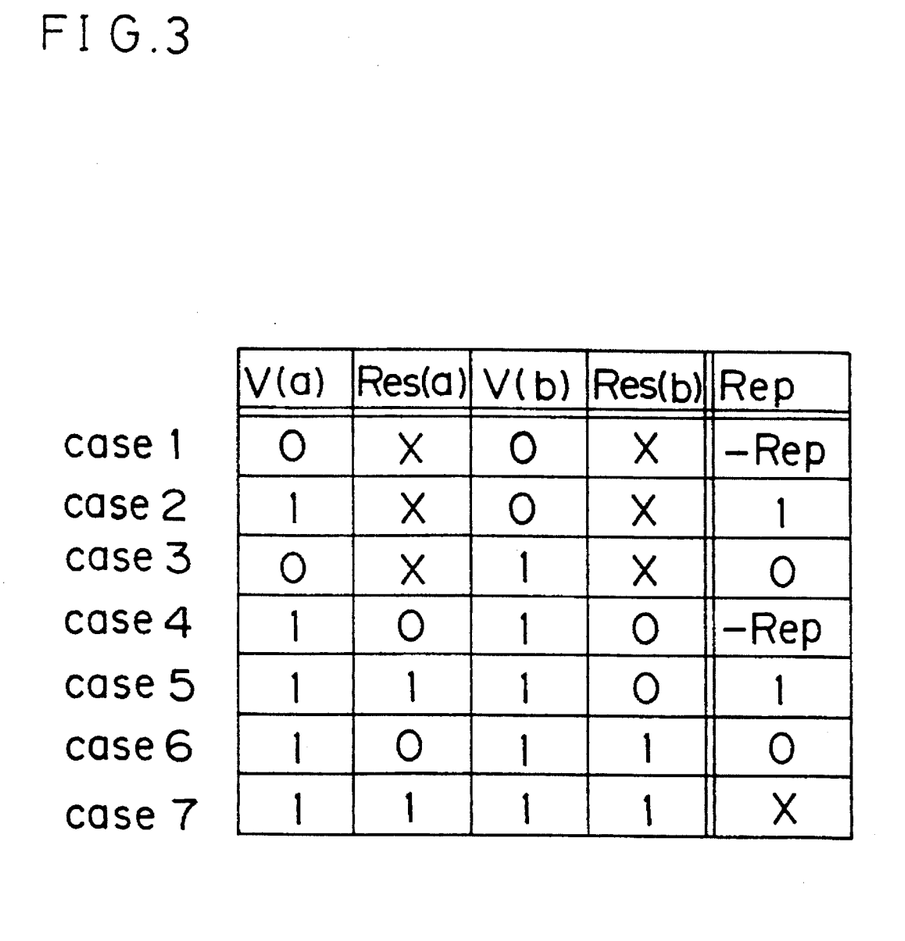
FIG. 3 shows in what way a replacement controller of FIG. 1 selects a right bank to be replaced.

How the replacement controller 9 determines which bank is to be replaced by the use of both the VALID bits 4a and 4b and the WRITE RESERVE bits 5a and 5b when a cache miss occurs is described (see FIG. 3). In FIG. 3, V(a) and Res(a) respectively represent the VALID bit 4a and the WRITE RESERVE bit 5a both read out from the first bank 1a, and V(b) and Res(b) respectively represent the VALID bit 4b and the WRITE RESERVE bit 5b both read out from the second bank 1b. Rep represents a bank which is selected by the replacement controller 9 for replacement when a cache miss occurs. By Rep=logic 0 is meant the first bank 1a. By Rep=logic 1 is meant the second bank 1b. By—Rep is meant a bank different from an earlier selected one. For example, if the first bank 1a was selected at an earlier time, the second bank 1b is selected next. x means "don't care", indicating that whether Rep is logic 0 or 1 does not matter. In case 7 of FIG. 3, Rep=x. This indicates that both the banks 1a and 1b are already waiting for a write operation. A new access, therefore, will be kept waiting, and it is not until either the WRITE RESERVE bit 5a or the WRITE RESERVE bit 5b is reset that a bank to be replaced is selected.

In the present example, when a cache miss occurs, both the VALID bits 4a and 4b and the WRITE RESERVE bits 5a and 5b are used for bank selection. This, however, is not to be considered restrictive. Other types of information may be used together with the VALID bits 4a and 4b and the WRITE RESERVE bits 5a and 5b. For example, a lock bit which prohibits a specific entry from being replaced, or a dirty bit which is indicative of data incoherence between the cache memory 100 and the main memory 103 may be used.

The replacement controller 9, since it can sense a bank into whose entry data is to be written by the use of the WRITE RESERVE bits 5a and 5b is able to select one of the banks 1a and 1b without involving entry replacement. This prevents the drop in cache memory performance. Additionally, the present example eliminates the need for comparing a write address with a new cache access request's address. No address comparators are required, accordingly. The present example becomes most effective in cases where a write buffer holds a great number of write requests.

EXAMPLE 2

Figure 4:
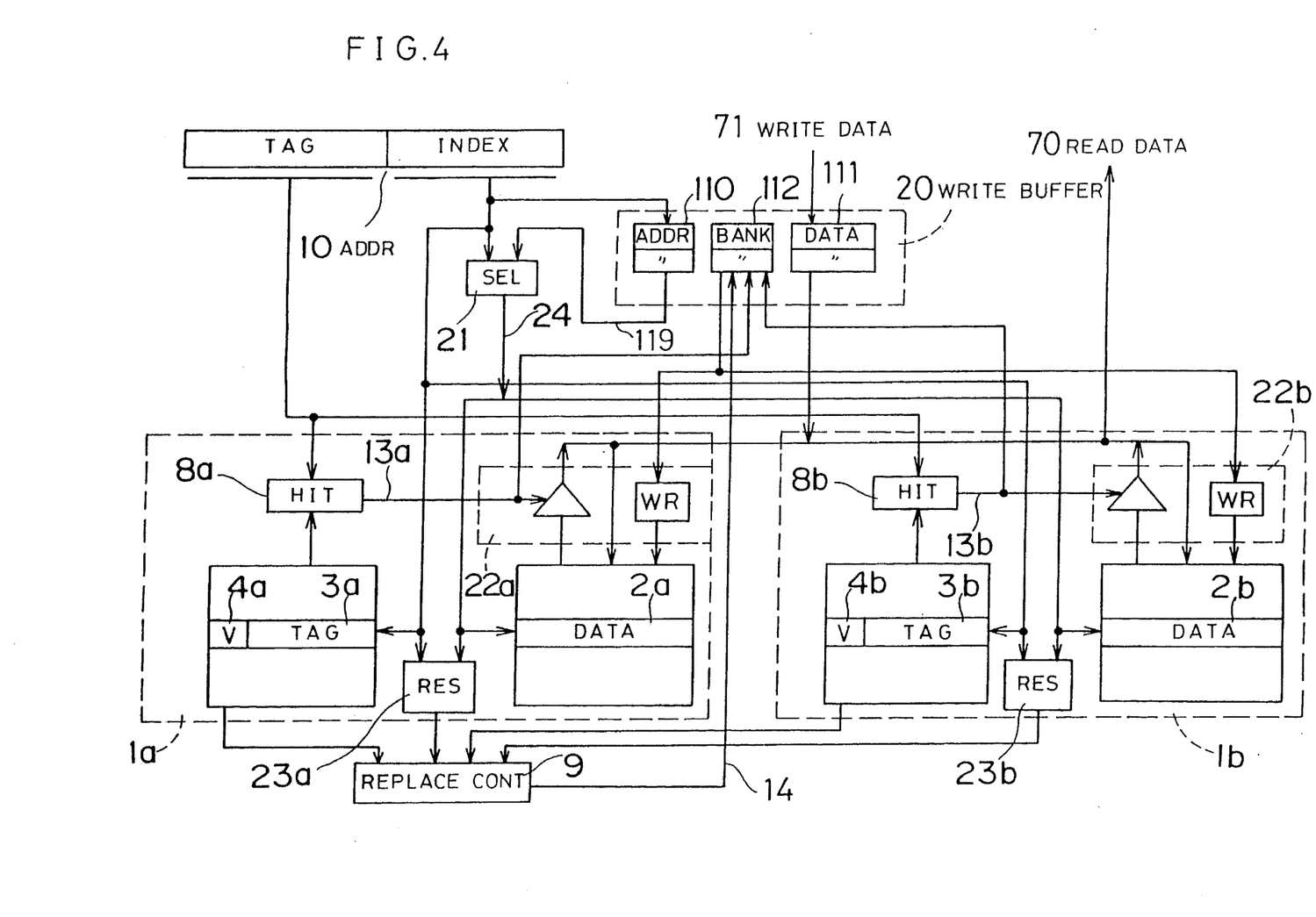
FIG. 4 is a block diagram of a second cache memory of the invention.

FIG. 4 is a second cache memory of the present invention. As mentioned previously, a write operation needs two cycles, one for detecting a cache hit and the other for the storage of data. When performing write operations in succession two cycles are needed for every write operation, but if a destination bank is known beforehand, this eliminates the need for reading out a tag when writing data to that bank. Further, when determining whether or not a write hit occurs, no data entry accesses are required. In other words, when carrying out two write operations in succession, it is possible to perform a data write operation in relation to the first write request while determining if a hit occurs in relation to the second write request. In accordance with the present example, it is feasible to apparently deal with write requests every cycle by means of pipeline processing that overlaps a tag entry read operation and a data write operation to a data entry.

In FIG. 4, functional parts assigned the same numbers as the first example have the same functions. The CPU 101, bus controller 102, and main memory 103 are not shown.

A write buffer 20 holds an index part 110 of the ADDRESS 10 (a write address) output from the CPU 101, WRITE DATA 111, and a BANK IDENTIFIER 112 which represents the number of a bank into which information is written. This BANK IDENTIFIER 112 is set by the CHIT 13a or by the CHIT 13b. If a cache miss occurs, the BANK IDENTIFIER 112 is set by the SELECTION signal 14. A selector 21 outputs the index part of the ADDRESS 10 output from the CPU 101 or an index part 119 of a write address output from the write buffer 20. The DATA ENTRIES 2a and 2b are accessible independently of the TAG ENTRIES 3a and 3b. The DATA ENTRIES 2a and 2b are accessed by an ADDRESS 24 output from the selector 21, whereas the TAG ENTRIES 3a and 3b are accessed by the index part of the ADDRESS 10. 22a and 22b are data access circuits used to access the DATA ENTRIES 2a and 2b.

To a read request, the selector 21 selects the index part of the ADDRESS 10 and outputs it. In other words, data and corresponding tag are read out at the same time. If a cache hit occurs in the bank 1a, data held at the DATA ENTRY 2a is read out by the corresponding data access circuit 22a. On the other hand, if a cache hit occurs in the bank 1b data held at the DATA ENTRY 2b is read out by the corresponding data access circuit 22b. Meanwhile, to a write request, the selector 21 selects the index part 119 of a write address output from the write buffer 20. It is possible to make the selector 21 always select and output the ADDRESS 119 output from the write buffer 20 when there is no read request. It is after the WRITE DATA 71 becomes available that a write operation actually takes place. More specifically, by making use of the WRITE ADDRESS 110 and the BANK IDENTIFIER 112, the data access circuits 22a and 22b select an entry and bank, and then the WRITE DATA 111 is written.

When a store instruction is executed, to this store instruction's write request, a tag is read out, and while checking for the occurrence of a cache hit or miss, an early-made write request, kept waiting at the write buffer 20, is dealt with.

Further, memory arrays 23a and 23b having write reserve bits per entry are provided independently of memory arrays for the TAG ENTRIES 3a and 3b. When a cache miss occurs, the replacement controller 9 selects one of the banks 1a and 1b so as not to replace an entry in relation to a write request whose execution is being held up. In such a situation, a write reserve bit is read out using the index part of the ADDRESS 10 when a cache hit occurs. Such a write reserve bit is set to an entry of a bank hit if the access request is a write request. On the other hand, if a cache miss occurs, a write reserve bit 1s set in relation to an entry of a bank that is selected by the replacement controller 9 and is reset using the ADDRESS 24 output from the selector 21 in writing data. Write reserve bits may be provided on the same memory arrays as the TAG ENTRIES 3a and 3b, as in the first example.

In accordance with the second example, since the BANK IDENTIFIER 112 is held at the write buffer 20, a write address tag part is not required when writing data. The write buffer 20 therefore requires less circuit areas. Further, since it is unnecessary to access a tag when writing data, this makes it possible to deal with write requests in a pipeline processing manner by providing a means capable of separately accessing the DATA ENTRIES 2a and 2b and the TAG ENTRIES 3a and 3b.

EXAMPLE 3

Figure 5:
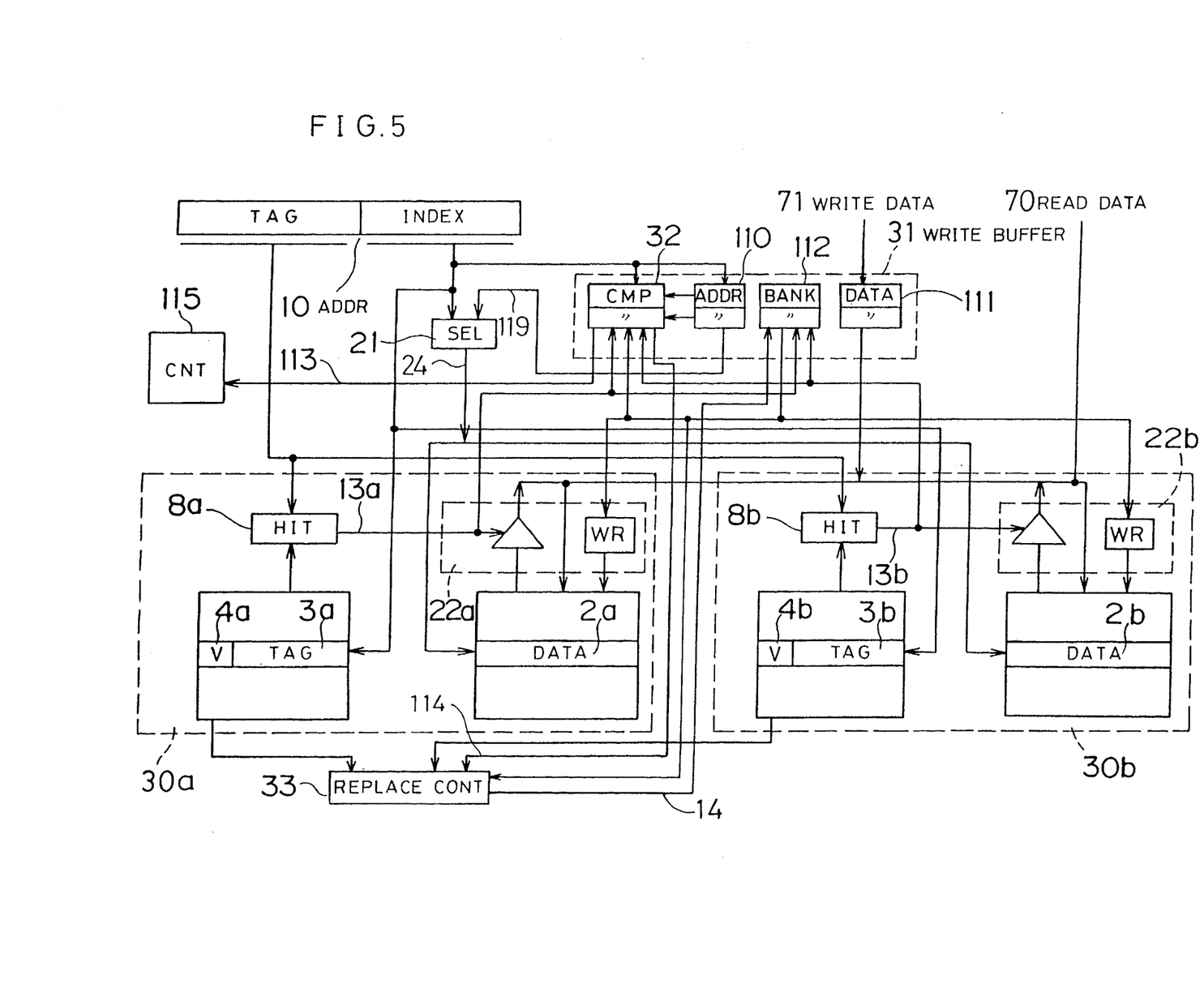
FIG. 5 is a block diagram of a third cache memory of the invention.

FIG. 5 is a third cache memory of the present invention. FIG. 5 shows banks 30a an 30b that are identical in configuration with the banks 1a and 1b of the second cache memory except that they are provided with no write reserve bits. A write buffer 31 is also identical in configuration with the write buffer 20 of the second cache memory except that it further includes a coincidence detector 32.

Following the execution of a store instruction, when the CPU 101 (not shown in FIG. 5) outputs the ADDRESS 10, both the TAGS 3a and 3b and the VALID bits 4a and 4b are read out from the bank 30a and the bank 30b using the index part of the ADDRESS 10, and the hit detectors 8a and 8b check for the occurrence of a cache hit. In the case of a cache hit, the CHIT 13a or the CHIT 13b is stored into the write buffer 31 so that it serves as the BANK IDENTIFIER 112 indicative of which of the banks 30a and 30b is hit. Then, the WRITE ADDRESS' 10 index part and the WRITE DATA 71, too, are stored into the write buffer 31. In the case of a cache miss, the SELECTION signal 14, output from a replacement controller 33, is stored into the write buffer 31 so that it serves as the BANK IDENTIFIER 112. Thereafter, the index part 110, stored at the write buffer 31, is selected by the selector 21 and the BANK IDENTIFIER 112, stored also at the write buffer 31, is applied to the data access circuits 22a and 22b so as to designate a bank and entry. Then, the data write operation takes place.

In the case of successively executing two store instructions, by reading out both the TAGS 3a and 3b and the VALID bits 4a and 4b from the bank 30a and the bank 30b by means of the index part of the ADDRESS 10 of a second store instruction and by making the selector 21 select the ADDRESS 119 held at the write buffer 31, it is possible to successively deal with data write processes every cycle in a pipeline processing manner.

After a cache hit is detected in relation to a store instruction, if a load instruction is executed before writing data, the selector 21 selects the index part of the ADDRESS 10 in relation to the load instruction whereby the DATA ENTRIES 2a and 2b as well as the VALID bits 4a and 4b are read out. Then, the coincidence detector 32 compares the index part of the ADDRESS 10 of the load instruction with the index part 110 of a write address kept in the wait state at the write buffer 31. If a successful comparison of these two index parts occurs, and if the BANK IDENTIFIER 112 corresponding to the write address and the number of a bank that is hit in relation to the ADDRESS 10 of the load instruction is the same, the coincidence detector 32 sends out an ADDRESS COINCIDENCE signal 113 to a controller 115. This indicates that the address of a load instruction and that of a store instruction are the same, so that when the controller 115 receives the ADDRESS COINCIDENCE signal 113, it keeps the load instruction waiting until a write operation in relation to the store instruction is over. If a cache hit occurs in relation to a load instruction, and further, if the index part of the ADDRESS 10 of the load instruction does not match with the index part 110 of a write address kept in the wait state at the write buffer 31 or if the BANK IDENTIFIER 112 does not match with the number of a bank that is hit, the ENTRY 2a or the ENTRY 2b, whichever exists in such a hit bank, is read out to the CPU 101. Further, the coincidence detector 32 compares the index part of the ADDRESS 10 of a load instruction with the index part 110 of a write address kept in the wait state at the write buffer 31. If they are found to be the same, and if the load instruction causes a cache miss, the coincidence detector 32 outputs an INDEX COINCIDENCE signal 114. By the use of the INDEX COINCIDENCE signal 114, and the BANK IDENTIFIER 112 corresponding to the write address, the replacement controller 33 selects a bank whose number is different from that represented by that BANK IDENTIFIER 112, as a result of which data, which is read out in response to the load instruction from the main memory, is stored into the bank thus selected. If the coincidence detector 32 does not send out the INDEX COINCIDENCE signal 114 when a cache miss occurs, the replacement controller 33, regardless of write requests held at the write buffer 31, selects one bank by making use of the VALID bits 4a and 4b read out so that data is stored into the bank thus selected, and sends out the SELECTION signal 14. This is the same as cases 1 to 4 of FIG. 3.

Figure 6:
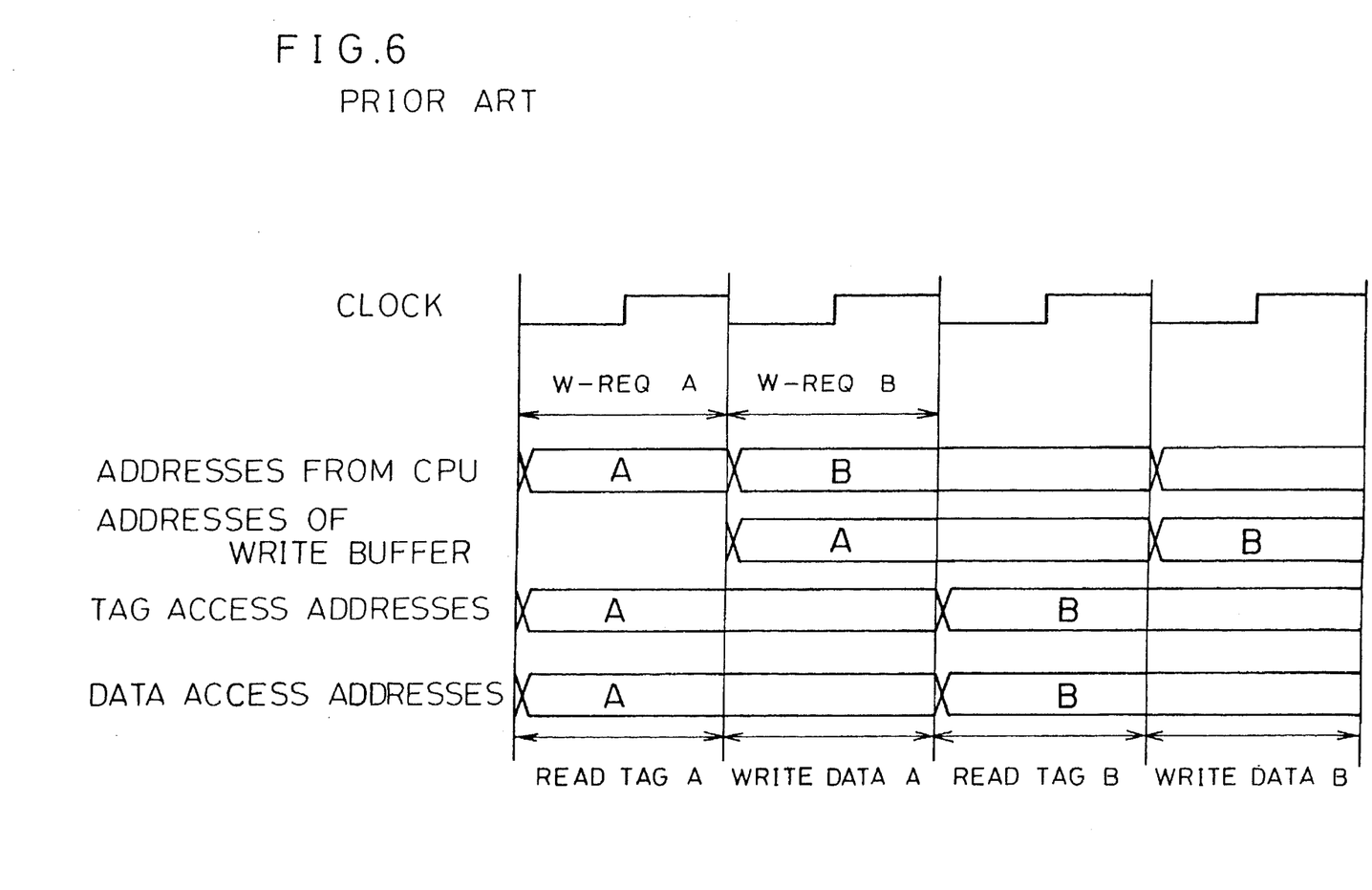
FIG. 6 is a timing diagram showing a case where successive store instructions are executed by a conventional cache memory.
Figure 7:
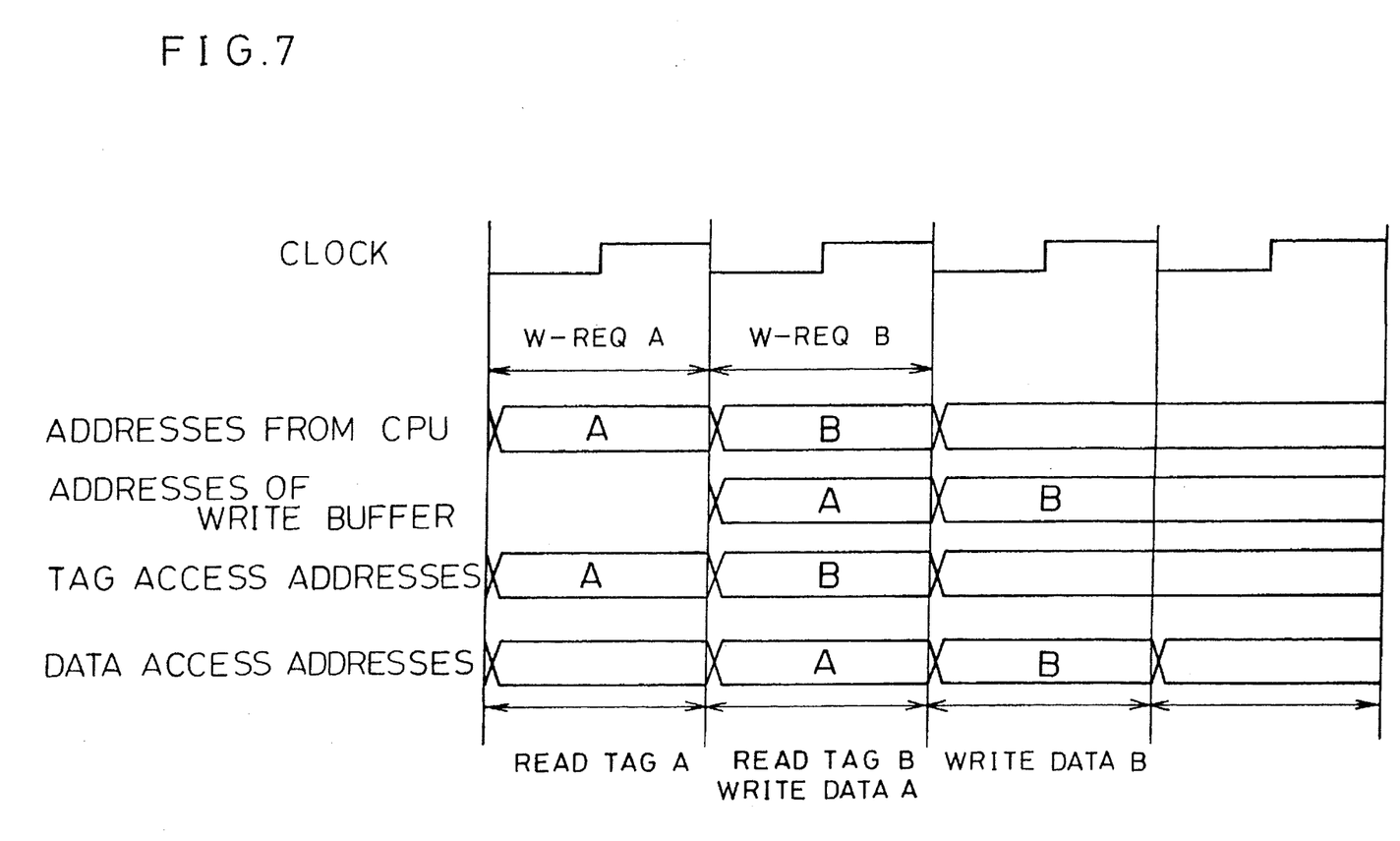
FIG. 7 is a timing diagram showing a case where successive store instructions are executed by the first cache memory or by the second cache memory.

FIG. 6 is a timing diagram when executing store instructions in succession with a conventional cache memory. FIG. 7 is a timing diagram when executing store instructions in succession with the second or third cache memory of the present invention. As clearly seen from FIG. 6, it is not possible for a conventional cache memory to simultaneously execute a tag readout operation by the ADDRESS "B" and a data write operation by the ADDRESS "A". A store instruction, therefore, requires two cycles in the prior art. Conversely, a cache memory in accordance with the present invention can carry out those two different operations at the same time, as a result of which the number of cycles can be reduced.

In accordance with the present example, the index part 110 of a write address and the BANK IDENTIFIER 112 is held at the write buffer 31. The index part 110 is compared with the index part of the address of a new access request, whereas the BANK IDENTIFIER 112 is compared with the number of a bank that is hit. Because of this, it is possible to determine whether the address of a write request kept in the wait state and the address of a new access request are the same. Conventionally, such comparison is made by using both the tag and index parts of an address. The present invention involves a less number of bits when making a comparison. It is therefore possible to reduce the size of comparators and circuits for holding addresses and thus to improve the speed of comparison processing. Further, in cases where a new access causes a cache miss, the replacement controller 33 preferentially selects a particular bank whose bank number differs from that represented by the BANK IDENTIFIER 112 so as to write data, which is read out from the main memory in relation to the new access which has caused a cache miss, into that particular bank selected. This arrangement prevents entry collisions between a write request kept waiting and a new access request, prevents faulty operation, and prevents the drop in cache memory performance.

EXAMPLE 4

Figure 8:
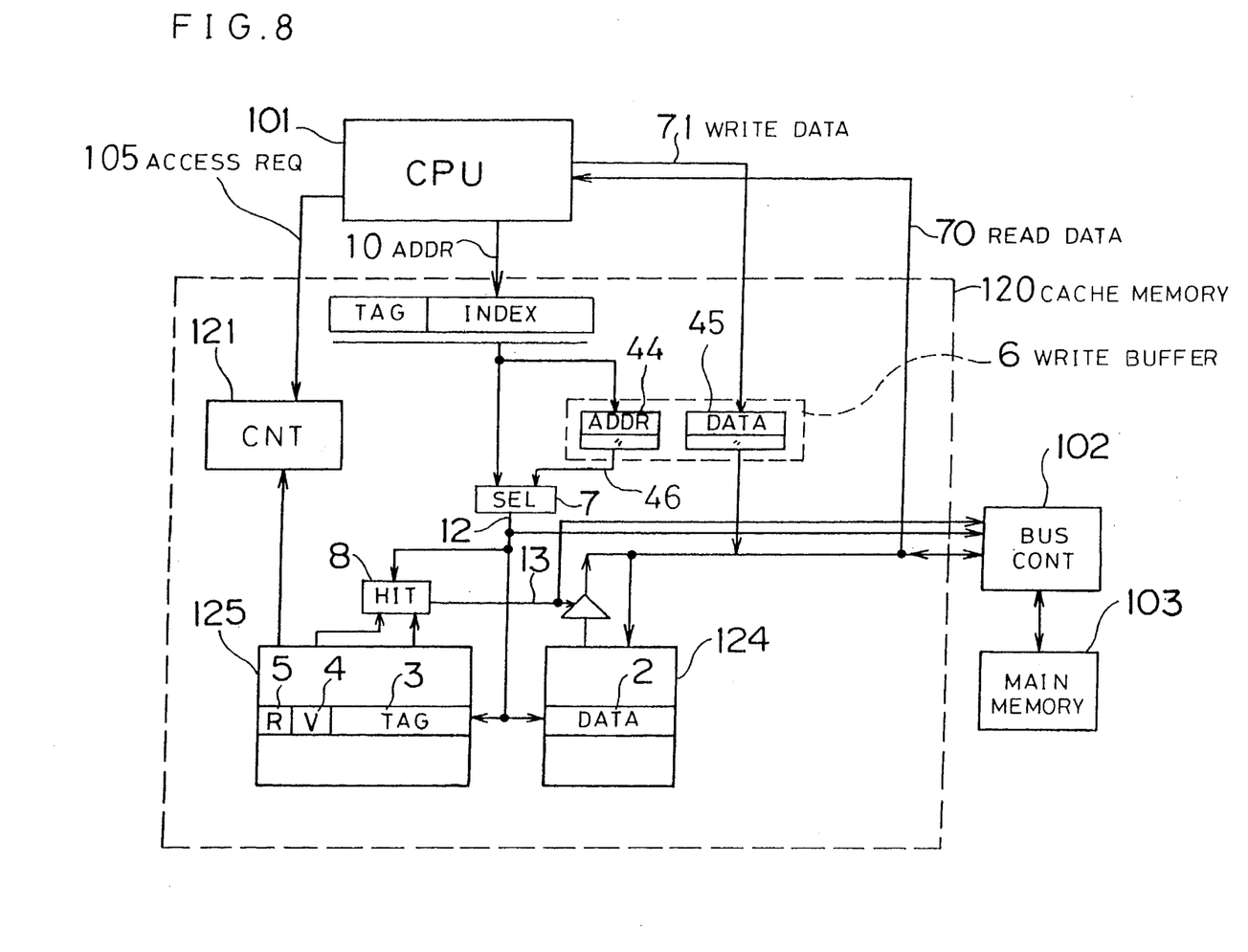
FIG. 8 is a block diagram of a data processor employing a fourth cache memory of the invention.

Referring now to FIG. 8, a fourth cache memory of the present invention is explained. For simplicity's sake, a case, where this fourth cache memory is a directly mapped cache memory, is described. If the CPU 101 issues a write request, a tag part memory 125 reads out a TAG ENTRY 3, VALID bit 4, and WRITE RESERVE bit 5 by the ADDRESS 10 given. A hit detector 8 determines if a hit or miss occurs by the comparison between the TAG ENTRY 3 and the tag part of the ADDRESS 10 as well as by the value of the VALID bit 4. If a cache hit occurs, the WRITE RESERVE bit 5 is set at logic 1 and the ADDRESS 10 and the WRITE DATA 71 are stored into ENTRIES 44 and 45 of the write buffer 6. If the CPU 101 cannot supply write data at once, this write operation is kept waiting until the CPU 101 supplies such write data. Thereafter, the ADDRESS 44 is timely read out and the selector 7 selects it. The WRITE DATA 45, which has been stored at the write buffer 6, is stored into a DATA ENTRY 2 of a data part memory 124 designated by the ADDRESS 12 output from the selector 7. At the same time, the WRITE RESERVE bit 5 is reset at logic 0. Then, the write operation is over.

In the case of a cache miss, the WRITE RESERVE bit 5 is set at logic 1, and the ADDRESS 10 and WRITE DATA 71 are stored into the write buffer 6, and the bus controller 102 fetches the corresponding data from the main memory 103. The data thus read out from the main memory 103 is partly replaced by the WRITE DATA 45 stored at the write buffer 6, thereafter being stored into the DATA ENTRY 2 of the data part memory 124 designated by the ADDRESS 44 stored at the write buffer 6. Then, the tag part of the ADDRESS 44 stored at the write buffer 6 is stored into the TAG ENTRY 3 of the tag part memory 125, and the VALID bit 4 is set at logic 1, and the WRITE RESERVE bit 5 is reset at logic 0. The write operation now comes to end.

Next, a case, where a read request is issued before completion of a write operation, is described below. When a write address is different from a read address, this status allows a read operation to be carried out in preference to a write operation by an early-issued write request. If the WRITE RESERVE bit 5, which is read out by accessing the tag part memory 125 by the use of the index part of the ADDRESS 10 (read address), is logic 0, this is such a status as to allow a read operation to be carried out preferentially. A case where a write address is identical with a read address, or a case where a write address and a read address have different tag parts but they have the same index parts can be detected from the fact that the WRITE RESERVE bit 5 read out is logic 1. In this case, the WRITE RESERVE bit 5 is supplied to the controller 121. The controller 121 then keeps a read operation waiting until a write request held at the write buffer 6 is completed and until the WRITE RESERVE bit 5 is reset at logic 1.

In this way, it becomes possible to prevent data that has not been updated by a preceding data write operation from erroneously being read out by a lately issued read request and further to prevent data and a tag to be stored by an earlier data write operation from erroneously being rewritten due to a read miss. Further, it is unnecessary for a comparator to compare a write address with a read address. The size of circuits can be reduced.

EXAMPLE 5

Figure 9:
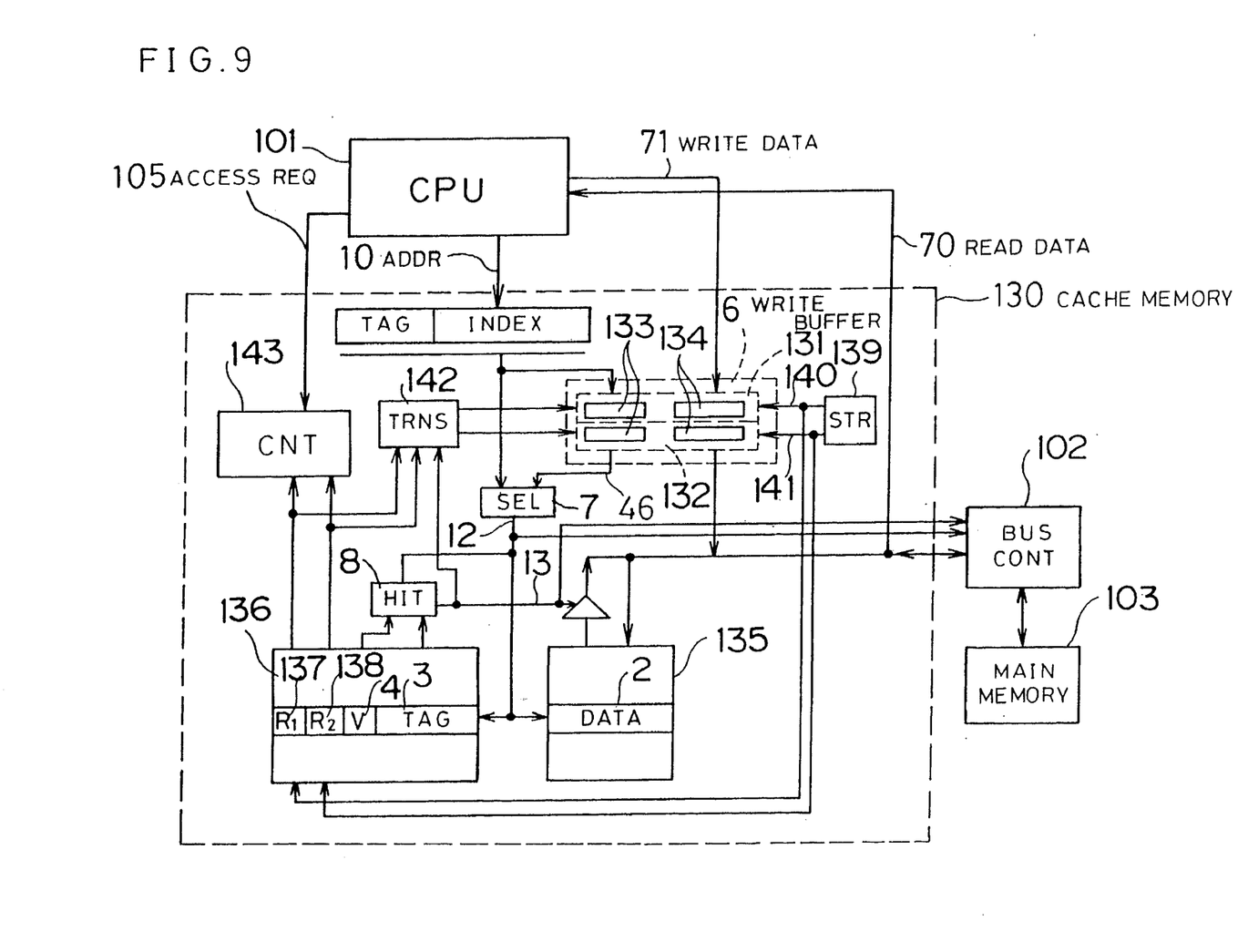
FIG. 9 is a block diagram of a data processor employing a fifth cache memory of the invention.

FIG. 9 is a fifth cache memory of the present invention. For simplicity's sake, a case, where a cache memory 130 in accordance with the present example is a directly mapped cache memory, is described. In the present example, the write buffer 6 has two ENTRIES 131 and 132 each holding a WRITE ADDRESS 133 and WRITE DATA 134. A data part memory 135 has a plurality of ENTRIES 2 for the storage of data. A tag part memory 136 has TAG ENTRIES 3 of addresses corresponding to each ENTRY 2 of the data part memory 135, VALID bits 4, WRITE RESERVE bits 137 of two bits, and WRITE RESERVE bits 138 of two bits. The WRITE RESERVE bits 137 and 138 are corresponding to the ENTRIES 131 and 132, respectively. When, to a write request issued from the CPU 101, the WRITE ADDRESS 133 and WRITE DATA 134 are stored into the first ENTRY 131 of the write buffer 6, the first WRITE RESERVE bit 137 is set at logic 1, whereas, when they are stored into the second ENTRY 132 of the write buffer 6, the second WRITE RESERVE bit 138 is set at logic 1. Such is done by storing ENTRY SELECTION signals 140 and 141, output from a write buffer storage controller 139 used to control the write buffer's 6 storage, into the WRITE RESERVE bits 137 and 138.

A case, where the CPU 101 makes a read request before completion of a write operation in relation to a write request, is described. Access to the tag part memory 136 is made by the READ ADDRESS 10 so as to read out both the WRITE RESERVE bit 137 and the WRITE RESERVE bit 138. If both the WRITE RESERVE bit 137 and the WRITE RESERVE bit 138 are logic 0's, this indicates that a write address is different from a read address. In this ease, it is possible to deal with a read request in preference to a write request. If either one of the WRITE RESERVE bits 137 and 138 is logic 1,and if the hit detector 8 senses a cache hit and sends out a cache hit signal 13, this indicates that a write address and a read address are the same. For instance, if the first WRITE RESERVE bit 137 is logic 1, this indicates that the WRITE ADDRESS 133 and a read address stored at the first ENTRY 131 corresponding to the bit 137 are the same. In other words, the WRITE DATA 134 stored at the first ENTRY 131 is the very data the CPU 101 is now trying to read out. A data transfer controller 142 reads out the DATA 134 of the first ENTRY 131, thereafter transferring it to the CPU 101. In this way, it is possible to supply the CPU 101 with data by preferentially dealing with a read request before completion of a write operation in relation to a write request.

Accordingly, by shortening the CPU's stand-by time, it is possible to improve data processor performance.

If either one of the WRITE RESERVE bits 137 and 138 is logic 1, and if the hit detector 8 detects a cache miss, the controller 143 exerts control so as to keep a read request in the wait state until the processing of a write request held at the write buffer 6 is over and until both the WRITE RESERVE bit 137 and the WRITE RESERVE bit 138 are reset at logic 0's. This prevents a tag and data in relation to a write request from erroneously being rewritten due to a read miss. Additionally, use of the WRITE RESERVE bits 137 and 138 eliminates the need for the provision of comparators used to compare a write address with a read address, and thus the size of circuits can be reduced.

Both the fourth and fifth cache memories 120 and 130 are directly mapped cache memories, however, they may be set-associative cache memories. The number of entries of the write buffer 6, although in the examples it is two, may be 1, or three or more.

The first, second, and third cache memories 100 are two-way set-associative cache memories, however, they may be n-way set-associative cache memories, with the number n being three or more.

In the first and second examples, the DATA ENTRIES 2a and 2b each are accessed by the ADDRESS 24 selected by the selector 21. The DATA ENTRIES 2a and 2b, however, may be formed by two-port memories, wherein a read operation by the ADDRESS 10 given and a write operation by the WRITE ADDRESS 110 stored at the write buffer 20 or 31 are carried out simultaneously. This eliminates the need for the provision of the selector 21. To sum up, much more load/store instruction are executable and thus the speed of data processors can be improved.

The invention claimed is:

1. A set-associative cache memory for preferentially dealing with access requests using addresses having a tag part and an index part, comprising:

a plurality of banks, each including:

a plurality of data entries, each for storing data;

a plurality of tag entries, each for storing a tag corresponding to a single data entry out of said plurality of data entries; and a plurality of write reserve bits, each corresponding to one of said plurality of data entries;

means for setting, when a tag part of a write address provided in association with a write access request and a tag read out from one tag entry selected according to the index part of the write address from said plurality of tag entries are in conformity with each other in one of said plurality of banks, one write reserve bit selected according to the index part of the write address from said plurality of write reserve bits in the one bank, and for resetting the thus selected write reserve bit when the write access request is fulfilled;

means for setting, when the tag part of the first write address provided in association with the write access request and the tag read out from the one tag entry selected according to the index part of the write address from said plurality of tag entries are not in conformity with each other in any of said plural banks, one write reserve bit selected according to the index part of the write address from said plural write reserve bits in one of said plural banks which is selected as a bank to be replaced for the write access request, and for resetting the thus selected write reserve bit when the write access request is fulfilled; and means for selecting, when a tag part of an address provided in association with a different access request and a tag read out from one tag entry selected according to an index part of the provided address from said plurality of tag entries are not in conformity with each other in any of said plurality of banks, one bank in which one write reserve bit read out according to the index part of the provided address from said plurality of write reserve bits is not set, as a bank to be replaced for the different access request.

2. The cache memory of claim 1, wherein each of said plurality of banks further comprises, a plurality of valid bits, each indicative of whether data stored in a corresponding data entry out of said plurality of data entries is valid.

3. The cache memory of claim 2, wherein said plurality of write reserve bits are arranged within a memory array which is common to said plurality of tag entries and said plurality of valid bits.

4. The cache memory of claim 2, wherein said plurality of write reserve bits are arranged within a memory array other than that of said plurality of tag entries and said plurality of valid bits.

5. A set-associative cache memory for preferentially dealing with access requests using addresses having a tag part and an index part, comprising:

a plurality of banks, each including:

a plurality of data entries, each for storing data; and a plurality of tag entries, each for storing a tag corresponding to a single data entry out of said plurality of data entries;

a write buffer for holding an identifier signal indicative of one bank out of said plurality of banks into which data is to be written in response to a first write access request, an index part of a first write address provided in association with the first write access request, and write data provided in association with the first write access request; and means for selecting one bank from said plurality of banks using said identifier signal held in said write buffer, for selecting one data entry from said plurality of data entries in the thus selected bank using the index part held in said write buffer and for writing the write data held in said write buffer into the thus selected data entry, during the time when the conformity is checked between a tag part of a second write address provided in association with a second write access request and a tag read out from one tag entry selected according to an index part of the second write address from said plurality of tag entries in any of said plurality of banks.

6. The cache memory of claim 5, wherein each of said plurality of banks further includes, a plurality of valid bits, each indicative of whether data stored in a corresponding data entry out of said plurality of data entries is valid.

7. The cache memory of claim 5, further comprising:

means for supplying an index part of a provided address to each of said plurality of tag entries in said plurality of banks; and means for selecting one of the index parts of the provided address and the index part held In said write buffer to supply the thus selected index part to each of said plurality of data entries in said plurality of banks.

8. The cache memory of claim 5, wherein each of said plurality of banks further includes, a plurality of write reserve bits, each corresponding to one of said plurality of data entries, and wherein said cache memory further comprises:

means for setting, when a tag part of the first write address provided in association with the first write access request and a tag read out from one tag entry selected according to the index part of the first write address from said plurality of tag entries are in conformity with each other in one of said plurality of banks, one write reserve bit selected according to the index part of the first write address from said plurality of write reserve bits in the one bank, and for resetting the thus selected write reserve bit when the first write access request is fulfilled;

means for setting, when the tag part of the first write address provided in association with the first write access request and the tag read out from the one tag entry selected according to the index part of the first write address from said plurality of tag entries are not in conformity with each other in any of said plurality of banks, one write reserve bit selected according to the index part of the first write address from said plurality of write reserve bits in one of said plurality of banks which is selected as a bank to be replaced for the first write access request, and for resetting the thus selected write reserve bit when the first write access request is fulfilled; and means for selecting, when a tag part of an address provided in association with a different access request and a tag read out from one tag entry selected according to an index part of the provided address from said plurality of tag entries are not in conformity with each other in any of said plurality of banks, one bank in which one write reserve bit read out according to the index part of the provided address from said plurality of write reserve bits is not set, as a bank to be replaced for the different access request.

9. The cache memory of claim 5, further comprising:

means for setting, when a tag part of the first write address provided in association with the first write access request and a tag read out from one tag entry selected according to the index part of the first write address from said plurality of tag entries are in conformity with each other in one of said plurality of banks, a signal for specifying the one bank as the identifier signal into said write buffer; and means for setting, when the tag part of the first write address provided in association with the first write access request and the tag read out from the one tag entry selected according to the index part of the first write address from said plurality of tag entries are not in conformity with each other in any of the plurality of banks, a signal for specifying one bank selected as a bank to be replaced for the first write access request as the identifier signal into said write buffer.

10. The cache memory of claim 9, further comprising:

means for keeping, when an index part of a read address provided in association with a read access request and the index part held in said write buffer are in conformity with each other and a signal for specifying a bank, in which a tag part of the read address and a tag read out from one tag entry selected according to the index part of the read address from said plurality of tag entries are in conformity with each other, and the identifier signal held in said write buffer are in conformity with each other, the read access request waiting until the first write access request is fulfilled.

11. The cache memory of claim 9, further comprising:

means for selecting, when an index part of an address provided in association with a different access request and the index part held in said write buffer are in conformity with each other, one bank different from the bank indicated by the identifier signal held in said write buffer as a bank to be replaced for the different access request.

12. A cache memory for preferentially dealing with access requests using addresses having a tag part and an index part, comprising:

a plurality of data entries, each for storing data;

a plurality of tag entries, each for storing a tag corresponding to a single data entry out of said plurality of data entries;

a plurality of write reserve bits, each corresponding to one of said plurality of data entries:

means for writing, when a tag part of a write address provided in association with a write access request and a tag read out from one tag entry selected according to an index part of the write address from said plural tag entries are in conformity with each other, the tag part of the write address into the tag entry selected according to the index part of the write address;

means for setting one write reserve bit selected according to the index part of the write address provided in association with the write access request from said plurality of write reserve bits, and for resetting the thus selected write reserve bit when the write request is fulfilled;

a write buffer for holding write data provided in association with the write access request; and means for supplying, when a tag part of a read address provided in association with a read access request and a tag read out from one tag entry selected according to an index part of the read address from said plurality of tag entries are not in conformity with each other and one write reserve bit read out according to the index part of the read address from said plurality of write reserve bits is set, the write data held in said write buffer as responsive data for the read access request.

13. The cache memory of claim 12, further comprising:

a plurality of valid bits, each indicative of whether data stored in a corresponding data entry out of said plurality of data entries is valid.

14. The cache memory of claim 12, wherein said write buffer further has a function of holding the index part of the write address provided in association with the write access request, and wherein said cache memory further comprises:

means for writing the write data held in said write buffer into one data entry selected according to the index part held in said write buffer from said plurality of data entries.

15. The cache memory of claim 12, wherein said write buffer comprises a plurality of write request entries each for holding write data.

16. The cache memory of claim 15, wherein each of said plurality of write reserve bits is set to specify one of said plurality of write request entries.

* * * * *